US008458269B2

(12) United States Patent
Friedman et al.

(10) Patent No.: US 8,458,269 B2
(45) Date of Patent: Jun. 4, 2013

(54) SELECTION OF EMAIL ATTACHMENT STORAGE LOCATION

(75) Inventors: Julian L. Friedman, Southampton (GB); Christopher Phillips, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 12/789,620

(22) Filed: May 28, 2010

(65) Prior Publication Data

US 2010/0306330 A1     Dec. 2, 2010

(30) Foreign Application Priority Data

Jun. 2, 2009   (EP) .................................. 09161648

(51) Int. Cl.
*G06F 15/16* (2006.01)
(52) U.S. Cl.
USPC ......... 709/206; 707/999.001; 707/10; 726/26
(58) Field of Classification Search
USPC ..................... 709/206, 223, 225; 707/999.01, 707/10
See application file for complete search history.

(56) References Cited

U.S. PATENT DOCUMENTS

| 5,903,723 | A | 5/1999 | Beck et al. |
|---|---|---|---|
| 6,684,248 | B1 * | 1/2004 | Janacek et al. ................. 709/225 |
| 7,113,948 | B2 * | 9/2006 | Jhingan et al. ......................... 1/1 |
| 7,257,639 | B1 | 8/2007 | Li et al. |
| 7,403,983 | B2 * | 7/2008 | Ueno et al. .................... 709/223 |
| 2005/0086313 | A1 * | 4/2005 | Lucas et al. ................... 709/206 |
| 2005/0188026 | A1 * | 8/2005 | Hilbert et al. ................. 709/206 |
| 2006/0031309 | A1 * | 2/2006 | Luoffo et al. ................. 709/206 |
| 2008/0109448 | A1 * | 5/2008 | Aboel-Nil et al. .............. 707/10 |

* cited by examiner

*Primary Examiner* — Dustin Nguyen
(74) *Attorney, Agent, or Firm* — Patents on Demand P.A.; Brian K. Buchheit; Scott M. Garrett

(57) ABSTRACT

When an email server has a message from a sender to multiple recipients with an attachment file, an attachment application is activated. The attachment application stores preferences of email users for online storage locations. The method carried out extracts details of an email sender and recipients for the email message to be sent with an attachment file and compares the email sender and recipients with the stored preferences for online storage locations to select a common online storage location for the sender and recipients. A directory is created at the common online storage location for uploading the attachment file to the selected online storage location and the address of the attachment file at the selected online storage location is added to the email message. If a common online storage location is not available, a new account can be generated for the recipients at an online storage location.

17 Claims, 7 Drawing Sheets

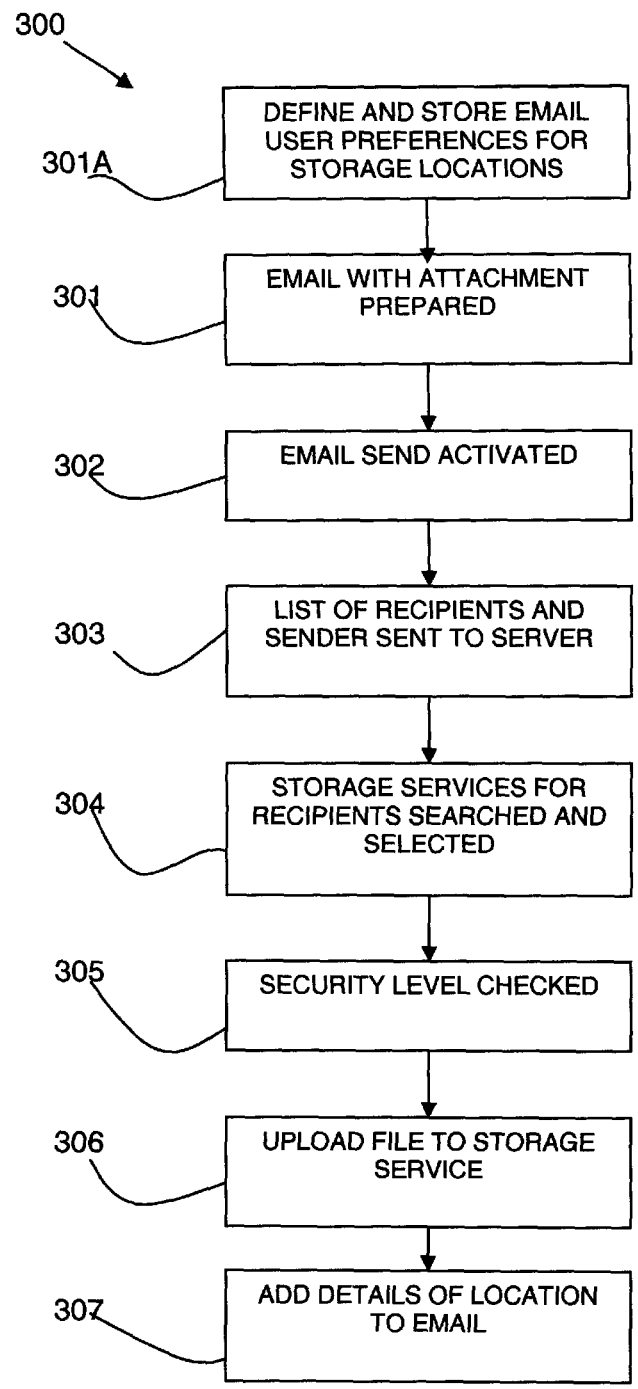

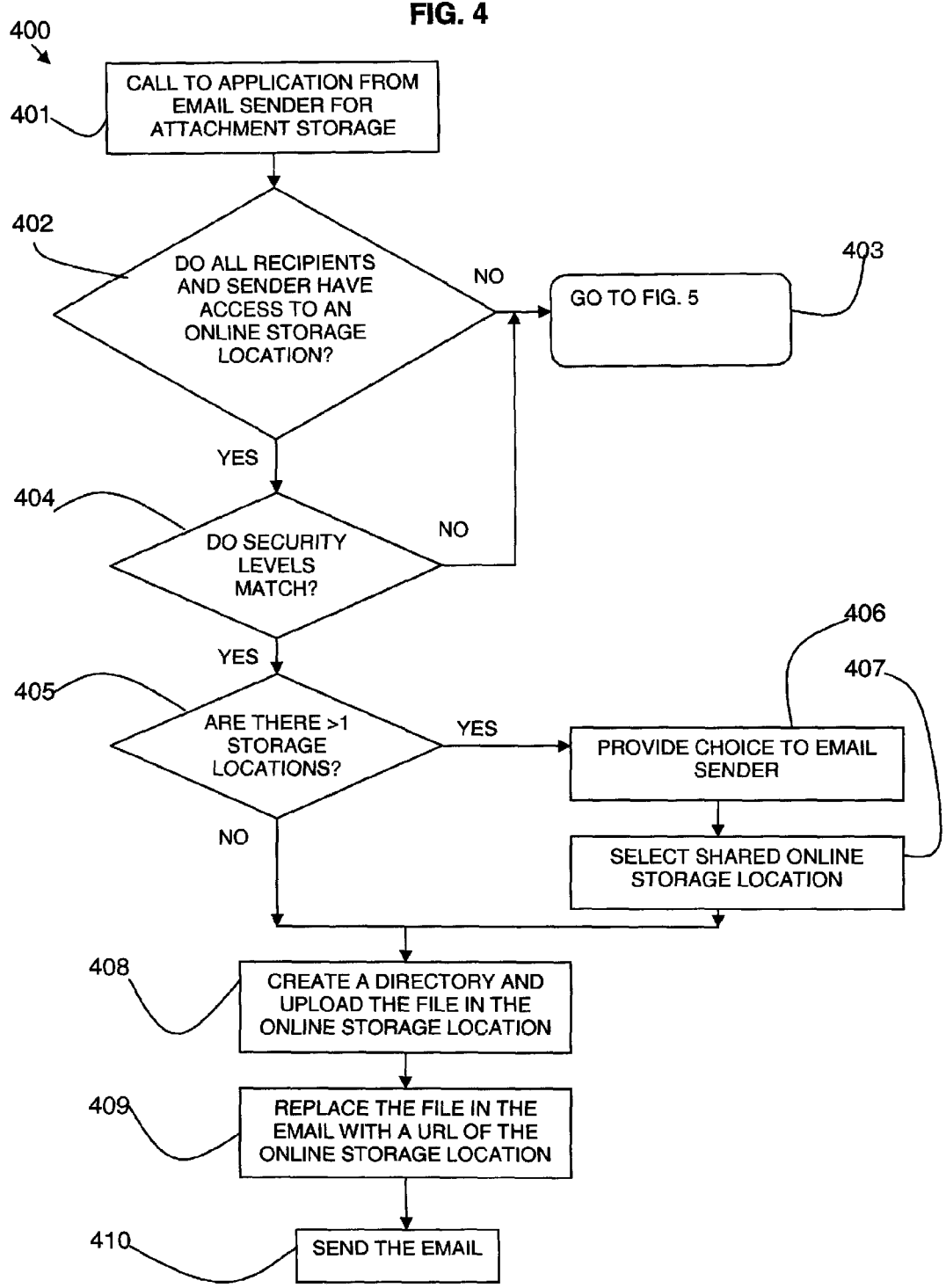

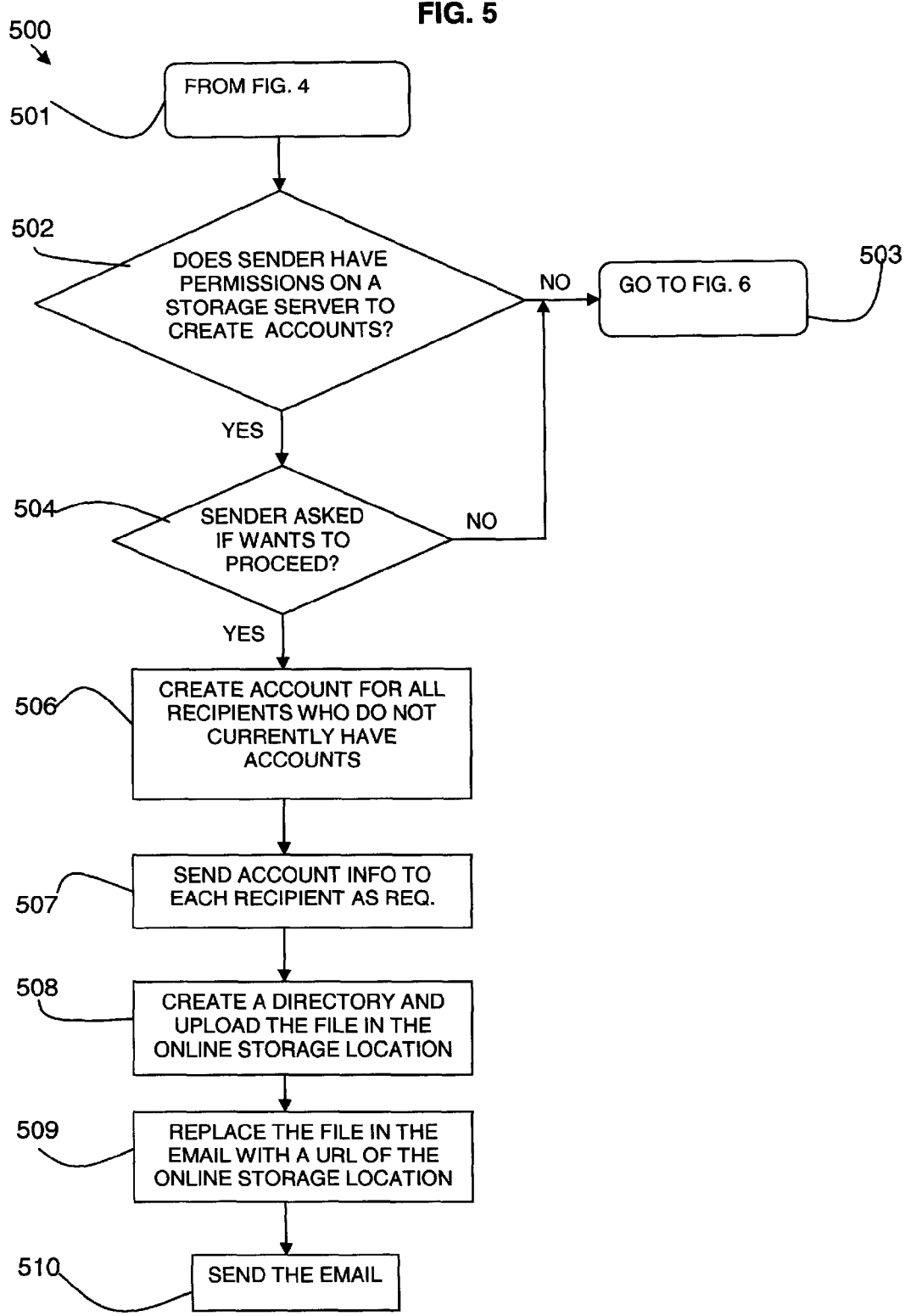

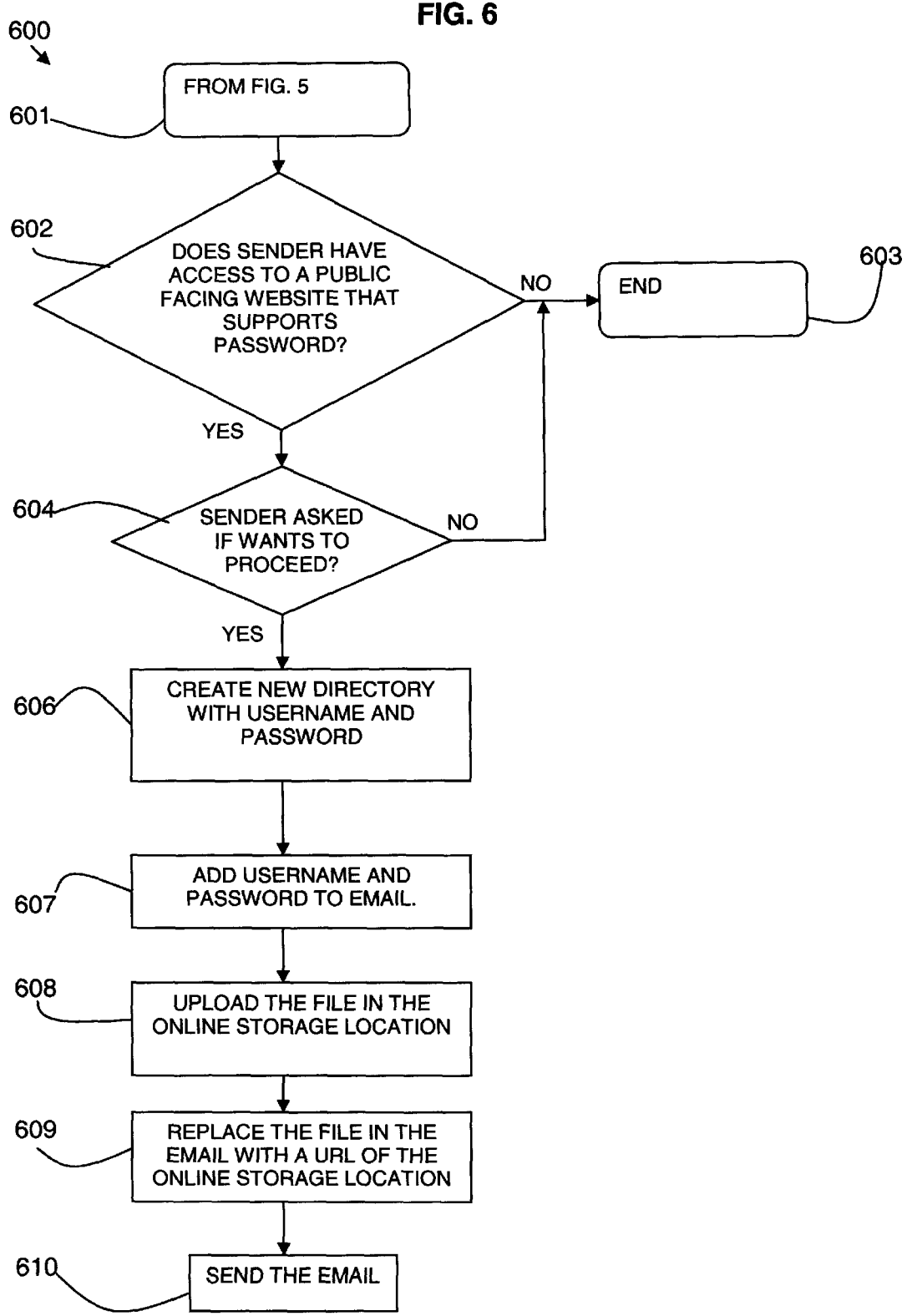

SELECTION OF EMAIL ATTACHMENT STORAGE LOCATION

CROSS-REFERENCE TO RELATED APPLICATIONS

This application claims the benefit of European Patent Application No. 09161648.2 filed 2 Jun. 2009 and entitled "Method and System for Selection of Email Attachment Storage Location", which is assigned to the assignee of the present application, and the teachings of which are hereby incorporated by reference in their entirety.

BACKGROUND

The disclosure relates to the field of communications software and hardware for email attachment storage and, more particularly, to selection of email attachment storage location.

It is often desirable to send large attachments in an email message to multiple recipients. For example, spreadsheets, presentations, high resolution images, etc. all result in large files. Sending large files separately as an attachment to each recipient is time consuming and wasteful of resources at the recipient. The time to receive a large file attachment at a recipient may delay receipt and inbox storage is taken up.

SUMMARY

Numerous aspects of the disclosure are contemplated which can be optionally implemented in various embodiments of the disclosure. Not all aspects are present in every embodiment, and described aspects are expected to be tailored and adapted for specific implementations. Thus, the various aspects and details expressed herein, when taken as a whole, permit one of ordinary skill in the art to grasp the scope of the present disclosure, which is defined more succinctly by the claims. It should be understood that nothing in this brief summary or detailed description is meant to be construed in a manner that limits the scope of the claimed content expressed herein.

According to a first aspect of the disclosure there is provided a method for selection of an email attachment storage location, comprising: storing preferences of email users for online storage locations; extracting details of an email sender and recipients for an email message to be sent with an attachment file; comparing the email sender and recipients with the stored preferences for online storage locations to select a common online storage location for the sender and recipients; creating a directory and uploading the attachment file to the selected online storage location; and adding an address of the attachment file at the selected online storage location to the email message.

Storing preferences of email users for online storage locations may include security levels for the online storage locations; and wherein comparing the email sender and recipients compares the security levels to ensure a common online storage location has the required security level.

If there is more than one common online storage location, the method may provide the email sender with a choice of online storage locations for selection.

If there are no common online storage locations, the method may include: creating an account at an online storage location for any recipients who do not have an account at the location; sending the newly created account information to the recipients; and using the online storage location as the selected online storage location.

Alternatively, if there are no common online storage locations, the method may include: creating a directory at a public facing website; sending the directory information to the recipients; and using the online storage location as the selected online storage location. The method may include generating a randomly selected username and password for the public facing website.

Storing preferences of email users for online storage locations may include storing email users' login information for the online storage locations.

An online storage location may be provided by a server accessible on a network. Storing preferences of email users for online storage locations may include a designated storage location for attachments to an email message marked as confidential. An expiry of an attachment file may be set.

According to a second aspect of the disclosure there is provided a computer program product for selection of an email attachment storage location, the computer program product comprising: a computer readable medium; computer program instructions operative to: store preferences of email users for online storage locations; extract details of an email sender and recipients for an email message to be sent with an attachment file; compare the email sender and recipients with the stored preferences for online storage locations to select a common online storage location for the sender and recipients; create a directory and uploading the attachment file to the selected online storage location; and add an address of the attachment file at the selected online storage location to the email message; wherein said program instructions are stored on said computer readable medium.

According to a third aspect of the disclosure there is provided a system for selection of an email attachment storage location in the form of a hardware server, comprising: a processor; a data storage for storing preferences of email users for online storage locations; an extracting module for extracting details of an email sender and recipients for an email message to be sent with an attachment file; a comparing module for comparing the email sender and recipients with the stored preferences for online storage locations to select a common online storage location for the sender and recipients; a creating module for creating a directory and uploading the attachment file to the selected online storage location; and an update module for adding an address of the attachment file at the selected online storage location to the email message.

The system may cooperate with an email server and activate when an email message with an attachment file is sent from an email server. The system may include a user interface for entering preferences of email users.

The data storage for storing preferences of email users for online storage locations may include security levels for the online storage locations; and wherein the comparing module for comparing the email sender and recipients may compare the security levels to ensure a common online storage location has the required security level.

The system may include an option module for providing selection options to an email application if there is more than one common online storage location.

The system may include an account generating module for creating an account at an online storage location for any recipients which do not have an account at the location. The account generating module may include creating a directory at a public facing website.

The data storage for storing preferences of email users for online storage locations may include a designated storage location for attachments to an email message marked as confidential.

The system may include a module for optionally setting an expiry of an attachment file.

The recipient list of the email message is used to determine which shared storage space is suitable to upload to. Where multiple shared storage spaces are available a set of choices is presented to the sender.

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

BRIEF DESCRIPTION OF THE SEVERAL VIEWS OF THE DRAWINGS

FIG. 3 is a flow diagram of a method in accordance with the disclosure.

FIG. 4 is a flow diagram of a method of an aspect of the disclosure.

FIG. 5 is a flow diagram of a method of an aspect of the disclosure.

FIG. 6 is a flow diagram of a method of an aspect of the disclosure.

DETAILED DESCRIPTION

Figure 1A:
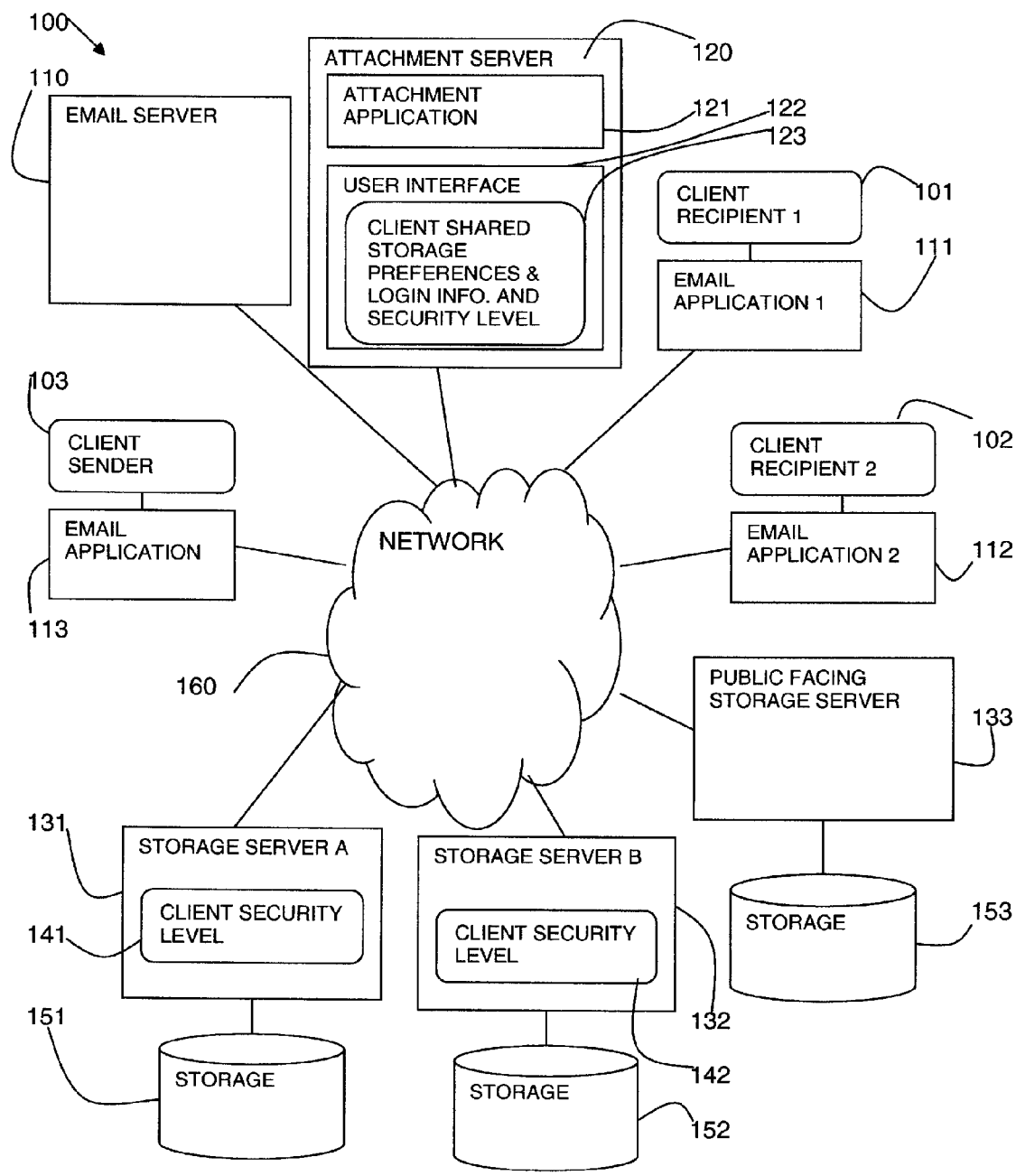
FIGS. 1A and 1B are block diagrams of a system in accordance with the disclosure.

A method, computer program product, apparatus, and system are described for selecting a shared storage location for multiple recipients of an email message. An attachment to the email message is uploaded to the selected shared storage location.

The disclosure cures deficiencies with existing prior art references for handling email attachments. For example, a plug-in for Lotus Notes (Lotus Notes is a trade mark of International Business Machines Corporation) exists, which will automatically remove any attachments from an outgoing email, and upload them to a shared space to share with the recipients. The shared space may be an internal storage system, for example, such as Global Storage Architecture (GSA) available on IBM's intranet (GSA and IBM are trademarks of International Business Machines Corporation) or a storage space on the Internet. This is suitable where only one shared space exists, however where different user groups may not have access to any one shared space it is of limited use. For example, a file cannot be shared with users without access to the intranet, and a confidential file cannot be shared with internal users if the shared space is available on the Internet. Further, existing art automatically, centrally handles attachments, and does not modify their handling based upon specifics of the recipients and other content of the email message to which the attachment is appended. At least these shortcomings are overcome by inventive arrangements of the disclosure elaborated upon herein.

The following email may be taken as an example (with is presented for non-limiting purposes as one possible implementation use case instance):

To: Fred@uk.ibm.com, John@uk.ibm.com, Pete@uk.ibm.com
From: LandLord@uk.ibm.com
Subject: Photos from the Pub
Date: 22/02/2009
Message
Here are the photos from the pub last night. As you may not remember it was a great night.
Land Lord
Attached Photos.zip When the user sends the email message, the system detects that Fred, John, Pete and he all have internal storage accounts on the company intranet, for example, GSA accounts on IBM's intranet. The system then creates a directory for the attachment with a generated name. This name may be generated from the date the email was sent and the email subject (for example, 20080222-PhotosFromThePub). The zip file would then be uploaded into this directory and saved with the name.

When the file has been uploaded, the system would remove the zip file from the email and enter an URL (uniform resource locator) at the bottom of the email indicating that the attachment can be downloaded.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1A, a system 100 is described in which an email system is provided. The email system includes a client sender 103 with an email application 113 and multiple client recipients 101, 102 each with email applications 111, 112. Each of the clients' email application 111-113 has an email server 110 which communicates the email message via a network 160, such as the Internet. Clients may have email applications 111-113 which use the same email server 110 or different email servers.

Conventionally, when an email message is sent with an attachment, the attachment is downloaded by the incoming email server from the outgoing email server. If required, the recipient client can download the attachment onto his client system from the incoming email server.

In the described system, an attachment server 120 is provided including an attachment application 121 which is activated when a client email application 113 attempts to send an email message with an attachment to multiple recipients 101, 102. The outgoing email server 110 of the client email application 113 may interact with the attachment application 121. The attachment application 121 may sit as a plug-in to the email application 113.

The attachment application 113 may be a software application provided on a hardware server and accessible via a network. The attachment application 121 includes a user interface 122 for inserting and storing clients' settings 123.

The clients' settings 123 include a list of the shared storage locations that a client 101-103 has access to together with the required login information and security level of the location. The list may be in a preferred order by the client 101-103. The list is stored with reference to the client's email address.

The attachment server 120 may be integral with, coupled to, or separate from an email server 110. The attachment server 120 may be integral with, coupled to, or separate from a shared storage server 131.

Storage servers 131, 132 are provided with storage 151, 152 which the clients 101-103 may have accounts with. If a client has a shared storage at a storage server 131, 132 there may be defined client security levels 141, 142 to ensure that shared storage is not accessed by non-security cleared clients.

In addition, public facing storage servers 133 also known as file hosting services, online file storage services, or online media centers are provided via the Internet with storage 153 for clients 101-103 who set up an account. They are specifically designed to host static content, typically large files that are not web pages and typically allow web and FTP (File Transfer Protocol) access. Known public facing storage servers include Rapidshare (Rapidshare is a trade mark of Rapidshare AG) which is a file hosting service allowing access to a file via a unique URL and Dropbox (Dropbox is a trade mark of Evenflow, Inc.) which allows storage and synchronizing of files online between computers.

Figure 1B:
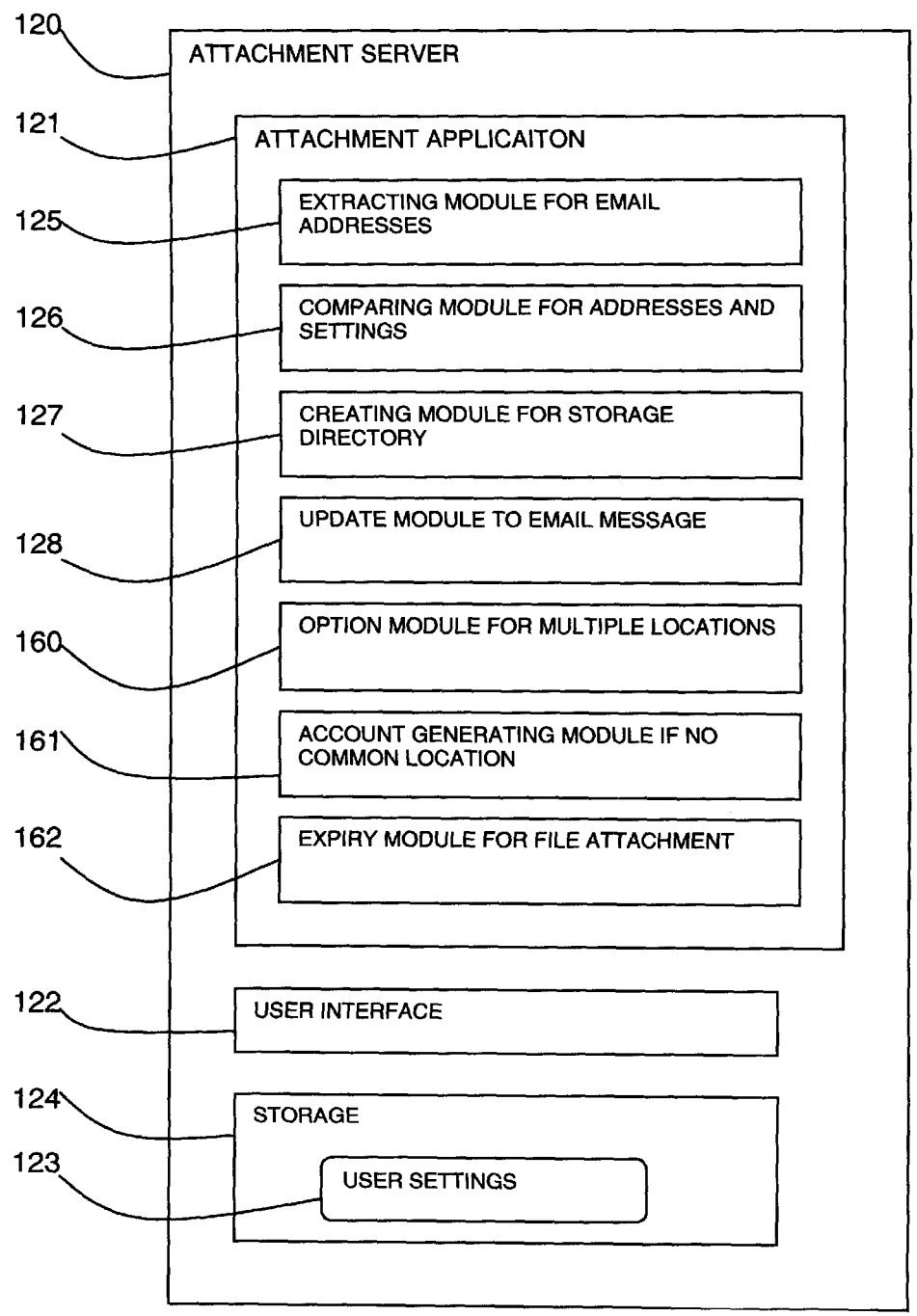

Referring to FIG. 1B further details are shown of the attachment server 120 and the attachment application 121. The attachment server 121 includes a data storage 124 for storing preferences 123 of email users for online storage locations. The user interface 122 enables users to enter their preference settings.

The attachment application 121 includes an extracting module 125 for extracting details of an email sender and recipients for an email message to be sent with an attachment file. It also includes a comparing module 126 for comparing the email sender and recipients with the stored preferences for online storage locations to select a common online storage location for the sender and recipients which meets selection criteria.

A creating module 127 is provided for creating a directory and uploading the attachment file to the selected online storage location and an update module 128 for adding an address of the attachment file at the selected online storage location to the email message.

The attachment server 120 cooperates with an email server 110 and activates when an email message with an attachment file is sent from an email server.

The attachment application 121 further includes an option module 160 for providing selection options to an email application if there are more than one common online storage locations.

An account generating module 161 is provided for creating an account at an online storage location for any recipients, which do not have an account at the location if there is no common location already. The account generating module 161 includes creating a directory at a public facing website.

An expiry module 162 may also be provided for optionally setting an expiry of an attachment file.

Default settings may be provided for storage selection. For example, if the attachment server 120 has its own storage, this storage may be used as the default location if it meets the selection criteria. If the email server has a default that fulfils the selection criteria, then this may be used as the default location.

Figure 2:
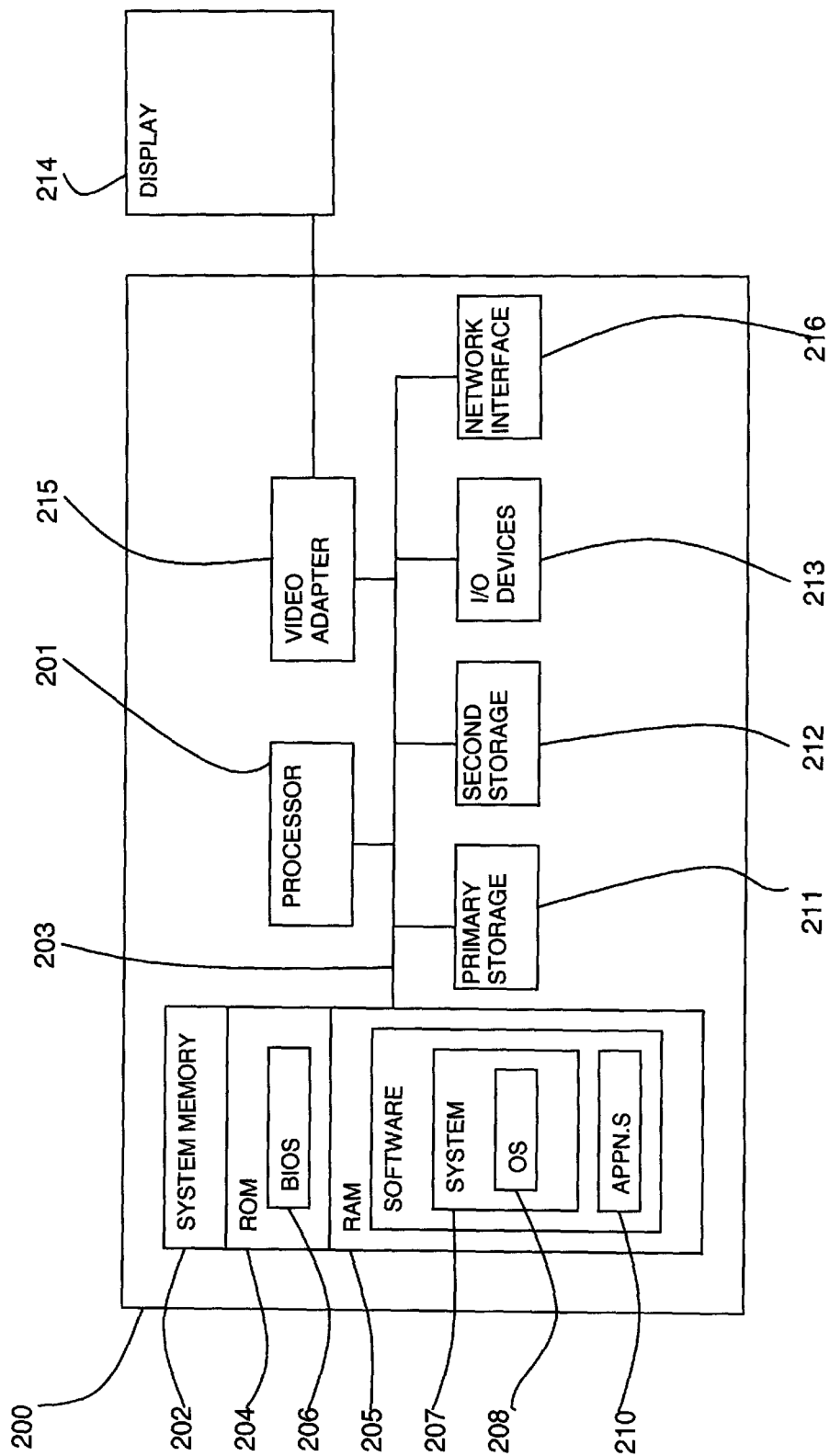
FIG. 2 is a block diagram of a computer system in which the disclosure may be implemented.

Referring to FIG. 2, an exemplary system for implementing client systems and servers includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Referring to FIG. 3, a flow diagram 300 shows a method carried out when a client sends an email to multiple recipients with an attachment. As an initial step, email users define and store 301A preferences for online storage locations at an attachment server. An email with an attachment is prepared 301 at a client email application and the email send is activated 302 at the email client application.

The email addresses of the recipients are extracted from the email header and a list of the message recipients and the sender is sent 303 to the attachment server. A shared storage location for the recipients and the sender is searched for and selected 304. The security level of the selected shared storage location is checked 305 for the message and recipients. In this way the selection criteria is that the sender must have access, the recipients must have access, and the security level of the server is acceptable.

The attachment file is uploaded 306 to the selected shared storage location from the sender email application. The details of the selected shared storage location are added 307 to the email message and the email message is sent.

Further details of how a shared storage location for the recipients and the sender is selected (step 304 in FIG. 3) are described in FIGS. 4-6. FIGS. 4 to 6 describe an example method of selecting the shared storage location, and the options may be changed in order. In another embodiment, the shared storage location may be selected by the level of security required by the email message and the highest security level storage accessible to the sender and recipients may be selected.

Referring to FIG. 4, a flow diagram 400 shows a method carried out when a call is received 401 from an email sender for attachment storage.

It is first determined if all recipients of the email message and the sender have access to a same online storage location or service. If they do not, then the method goes 403 to the flow diagram 500 of FIG. 5.

If they do have access to a same online storage location or service, it is determined 404 if the message security level matches the security level of the service assigned by the user in preferences. If the security levels do not match, then the method goes 403 to the flow diagram of FIG. 5.

If the security level matches, it is determined 405 if there is more than one storage location that all recipients have access to. If so, a list of the possible storage locations is provided 406 to the email sender to select 407 a repository for the attachment.

If there is only one storage location that all the recipients have access to, or if a location has been selected from multiple choices by the sender, a directory is created at the storage location and the attachment file is uploaded 408 to the storage location. The file is replaced 409 in the email message with a URL of the online storage location. The email message is sent 410.

Referring to FIG. 5, a flow diagram 500 shows the method undertaken if the recipients and the sender of an email message do not have access to a same online storage location as determined in FIG. 4 501 or if the security levels of a shared online storage location are not suitable.

It is then determined 502 if the sender has permissions on a storage server to create accounts. If not, the method goes 503 to the flow diagram of FIG. 6. If so, the sender is asked 504 if he wishes to proceed. This may be by a pop-up window which requires the sender to confirm he wants to follow this path. If the sender does not wish to proceed the method goes 503 to the flow diagram of FIG. 6.

If the sender does wish to proceed, an account is then created 506 at a storage server for any of the recipients who do not currently have an account. The account information is sent 507 to each recipient as required.

A directory is then created 508 in the new storage location and the attachment file is uploaded. The file in the email message is replaced 509 with a URL of the online storage location. The email is then sent 510.

Referring to FIG. 6, a flow diagram 600 shows the method undertaken if the sender does not have permission to create a storage account or the sender does not wish to proceed in that way as determined in FIG. 5 then the method goes 601 to FIG. 6.

It is then determined if the sender has access 602 to a public facing website that supports passwords. If the sender does not have such access, the method ends 603 and a window may be displayed to the sender that the attachment could not be saved on a secure external storage website. The sender may then send the email message with the attachment file or with the attachment file saved to a publicly accessible location.

If the sender does have such access, the sender is asked 604 if he wishes to proceed. This may be by a pop-up window which requires the sender to confirm he wants to follow this path. If the sender does not wish to proceed the method ends 603.

If the sender chooses to proceed, a new directory is created 606 in the public facing website with a randomly generated username and password. The username and password are added 607 to the email message. The attachment file is uploaded 608 to the online storage location. The attachment file is replaced 609 with the URL of the online storage location and the email message is sent 610.

An email user can set his preferred order of shared storage locations or services in the settings of the program for file attachment. The user can select which locations he has access to and can provide any login information for each location. This information is stored on a central server.

When the user is setting options for which storage servers to use, he can choose one to be used when confidential document are sent. Such email messages may be distinguished by the subject containing "confidential".

For security, the remote storage location or service may support HTTP authentication and use SSL (Secure Sockets Layer) where possible. Some web servers use cookies to store session details to simplify future logins. Such session data should not be stored in case someone uses the same computer and server but a different user account. This may allow then to upload a file to the first user's account on the server. Therefore, cookies are deleted after each email is completed and these may be either cancelled mid-send or after a completed send.

By determining a shared online storage location for the sender and recipients, for example, that all users have access to a shared GSA space, or that all users are internal to an intranet, the method can upload the attachment file automatically, for example, to the appropriate GSA directory, Lotus Team Room, cattail, or global FTP site.

A file attachment stored at a shared storage service may expire after a set amount of time. However, some attachments may be required for a long period of time and therefore a time to live option could be an option and would not be set as a default.

An attachment system may be provided as a service to a customer over a network.

For the avoidance of doubt, the term "comprising", as used herein throughout the description and claims is not to be construed as meaning "consisting only of". It will be appreciated by those skilled in the art that the invention is not just limited to email messages, but is also applicable to other types of messages that have a distribution list that can be updated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should be stated that in the preceding detailed description, numerous specific details are set forth in order to provide a thorough understanding of the disclosure. However, it will be understood by those skilled in the art that the present invention may be practiced without these specific details. In other instances, well-known methods, procedures, and components have not been described in detail so as not to obscure the disclosure.

What is claimed is:

1. A method for selection of an email attachment storage location, comprising:

storing preferences of email users for online storage locations;

extracting details of an email sender and recipients for an email message to be sent with an attachment file;

comparing the email sender and recipients with the stored preferences for online storage locations to select a common online storage location for the sender and recipients, wherein if there is more than one common online storage location, providing the email sender with a choice of online storage locations for selection, wherein if there are no common online storage locations, the method including: creating an account at an online storage location for any recipients which do not have an account at the location; and sending the newly created account information to the recipients and using the online storage location as the selected online storage location;

uploading the attachment file to the selected online storage location; and adding an address of the attachment file at the selected online storage location to the email message.

2. The method as claimed in claim 1, wherein storing preferences of email users for online storage locations includes security levels for the online storage locations; and wherein comparing the email sender and recipients compares the security levels to ensure a common online storage location has the required security level.

3. The method as claimed in claim 1, wherein if there are no common online storage locations, the method includes:
creating a directory at a public facing website;
sending the directory information to the recipients; and
using the online storage location as the selected online storage location.

4. The method as claimed in claim 3, including generating a randomly selected username and password for the public facing website.

5. The method as claimed in claim 1, wherein storing preferences of email users for online storage locations includes storing email users login information for the online storage locations.

6. The method as claimed in claim 1, wherein an online storage location is provided by a server accessible on a network.

7. The method as claimed in claim 1, wherein storing preferences of email users for online storage locations includes a designated storage location for attachments to an email message marked as confidential.

8. The method as claimed in claim 1, wherein an expiry of an attachment file is set.

9. A computer program product comprising a computer readable storage medium having computer usable program code embodied therewith, the computer usable program code comprising:
computer usable program code stored on a tangible storage medium that when executed by a processor is operable to store preferences of email users for online storage locations;
computer usable program code stored on a tangible storage medium that when executed by a processor is operable to extract details of an email sender and recipients for an email message to be sent with an attachment file;
computer usable program code stored on a tangible storage medium that when executed by a processor is operable to compare the email sender and recipients with the stored preferences for online storage locations to select a common online storage location for the sender and recipients,
wherein if there is more than one common online storage location, said computer usable code provides the email sender with a choice of online storage locations for selection,
wherein if there are no common online storage locations, the computer usable code creates an account at an online storage location for any recipients which do not have an account at the location; and sends the newly created account information to the recipients and using the online storage location as the selected online storage location;
computer usable program code stored on a tangible storage medium that when executed by a processor is operable to upload the attachment file to the selected online storage location; and
computer usable program code stored on a tangible storage medium that when executed by a processor is operable to add an address of the attachment file at the selected online storage location to the email message.

10. A system for selection of an email attachment storage location in the form of a hardware server, comprising:
a processor;
a data storage for storing preferences of email users for online storage locations; an extracting module for extracting details of an email sender and recipients for an email message to be sent with an attachment file;
a comparing module for comparing the email sender and recipients with the stored preferences for online storage locations to select a common online storage location for the sender and recipients;
an option module for providing selection options to an email application if there is more than one common online storage location;
account generating module for creating an account at an online storage location for any recipients which do not have an account at the location and for sending newly created account information to the recipients;
a creating module for creating a directory and uploading the attachment file to the selected online storage location; and
an update module for adding an address of the attachment file at the selected online storage location to the email message.

11. The system as claimed in claim 10, wherein the system cooperates with an email server, wherein the system is activated when the email message with an attachment file is sent from the email server.

12. The system as claimed in claim 10, including a user interface for entering preferences of email users.

13. The system as claimed in claim 10, wherein the data storage for storing preferences of email users for online storage locations includes security levels for the online storage locations; and wherein the comparing module for comparing the email sender and recipients compares the security levels to ensure a common online storage location has the required security level.

14. The system as claimed in claim 10, wherein the account generating module includes creating a directory at a public facing website.

15. The system as claimed in claim 10, wherein the data storage for storing preferences of email users for online storage locations includes a designated storage location for attachments to an email message marked as confidential.

16. The system as claimed in claim 10, including a module for optionally setting an expiry of an attachment file.

17. An apparatus for selection of an email attachment storage location, comprising:
means for storing preferences of email users for online storage locations;
means for extracting details of an email sender and recipients for an email message to be sent with an attachment file;
means for comparing the email sender and recipients with the stored preferences for online storage locations;
means for, if there is more than one common online storage location, the email sender is provided with a choice of online storage locations for selection,
means for, if there are no common online storage locations, creating an account at an online storage location for any recipients which do not have an account at the location; and sending the newly created account information to the recipients and using the online storage location as the selected online storage location;
means for, responsive to the means for comparing, for selecting a common online storage location for the sender and recipients;
means for uploading the attachment file to the selected online storage location; and means for adding an address of the attachment file at the selected online storage location to the email message.

* * * * *